July 15, 1958            J. BAILEY            2,843,486
PHOTOGRAPHIC FILTER AND ANTI-HALATION LAYERS
Filed Oct. 12, 1955
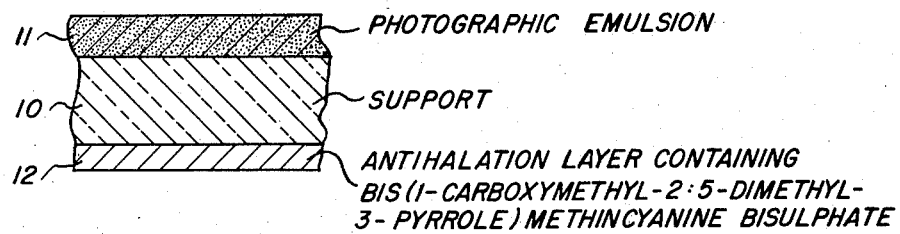
JOSEPH BAILEY
INVENTOR.
BY
ATTORNEYS

2,843,486

PHOTOGRAPHIC FILTER AND ANTI-HALATION LAYERS

Joseph Bailey, Harrow, England, assignor to Eastman Kodak Company, Rochester, N. Y., a corporation of New Jersey Application October 12, 1955, Serial No. 540,081

Claims priority, application Great Britain December 14, 1954

11 Claims. (Cl. 96—84)

This invention relates to light-absorbing photographic layers, and particularly to filter and anti-halation layers for photographic film.

In the preparation of sensitive photographic elements, it is frequently desirable to incorporate one or more layers of colloidal material containing dyes, or other coloring materials. These layers may fulfill any one of a number of purposes, such as the reduction of halation, filtration of certain undesirable rays from exposing radiation, either upon direct exposure in a camera, or other exposing device, or for re-exposure in a photographic reversal process. However, certain of the dyes for these purposes are frequently not sufficiently insoluble to remain in the gelatin layer in which they are incorporated, particularly in the multilayer coatings used in color photography. In this event, the dyes would be undesirably removed at some stage during the photographic treatment, since further exposure of the photographic element might be required to complete the color processing. On the other hand, if the dyes are insoluble enough, or are strongly adsorbed to the hydrophilic colloid in which they have been incorporated, it is frequently difficult to remove such dyes in the usual photographic processing baths.

In Kodak British specification 691,694, there is described a process for preparing monomethine dyes, some of which are useful in the preparation of photographic filter or anti-halation layers. The dyes produced according to this specification are quite useful for certain purposes, particularly for the preparation of light-screening layers, such as anti-halation layers, in photographic elements. Many of these dyes are rapidly bleached or destroyed by alkaline photographic developing solutions normally used in processing exposed photographic layers to visible images. However, certain of these dyes have the property of leaving stain, the presence of which is highly undesirable in any photographic elements. Furthermore, in the preparation of light-screening layers using these particular dyes, it is necessary to dissolve the dyes in an organic solvent, such as methanol or acetone, and then add this solution to an aqueous gelatin solution before coating the mixture on a support. It would be most desirable to have dyes having the useful properties of the dyes described in British specification 691,694 while at the same time, being substantially free of the undesirable staining properties and solubility problems which these dyes exhibit in certain cases.

I have now produced new dipyrrolomethin dyes which have improved properties, including improved solubility in aqueous solutions and more rapid decolorization in alkaline photographic solutions.

It is, accordingly, an object of the present invention to provide a light-sensitive photographic material having a filter or anti-halation layer of a hydrophilic colloid colored with a dye which can easily be removed during photographic processing without any substantial staining effects. A further object is to provide a novel light-absorbing layer for photographic film and other photographic elements. Another object is to provide novel dipyrrolomethin dyes and methods for making these novel dyes.

Other objects will become apparent from a consideration of the following description and examples.

In general, the above objects are accomplished by incorporating a dipyrrolomethin dye containing a 1-carboxyalkyl group in a hydrophilic colloid layer of a photographic element.

In the accompanying drawing, the figure shows a sectional view of a multilayer photographic element having an anti-halation layer made according to my invention.

The new dyes of my invention can advantageously be represented by the following general formula:

(I) 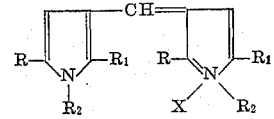

wherein R and $R_1$ each represents a lower alkyl group, such as methyl, ethyl, propyl, etc., $R_2$ represents a carboxyalkyl group, such as carboxymethyl, β-carboxyethyl, etc., and X represents an acid radical, such as chloride, bromide, sulphate, etc.

One method of making the novel dyes of my invention represented by Formula I above comprises condensing together two moles of an intermediate selected from those represented by the following general formula:

(II) 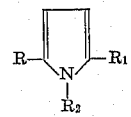

wherein R, $R_1$ and $R_2$ each have the values given above, in the presence of an excess of an alkyl orthoformate such as methyl orthoformate, ethyl orthoformate, etc., and in the presence of a strong mineral acid, such as sulphuric acid. Another method of preparing the novel dyes of my invention represented by Formula I above comprises condensing together two moles of an intermediate selected from those represented by Formula II above with formic acid in the presence of a strong mineral acid, such as sulphuric acid. While these two methods of preparing the new dyes of my invention provide products wherein X in Formula I above is bisulphate (i. e., $HSO_4^-$), dyes wherein X represents a different acid radical can be prepared according to the methods described in U. S. Patents 2,245,249 and 2,245,250.

The intermediates represented by Formula II above can advantageously be prepared according to the method described by Fischer in "Ber.," vol. 34, (1901), page 438 by condensing together a compound selected from those represented by the following general formula:

(III) 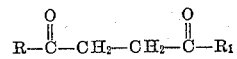

wherein R and $R_1$ each have the values given above together with an amino ester, followed by hydrolysis of the resulting pyrroleacetic acid ester to the corresponding acid. For example, condensation of acetonylacetone together with glycine ethyl ester, followed by hydrolysis of the resulting ester, produces a compound corresponding to that of Formula II wherein R and $R_1$ are each methyl groups.

The following examples will serve to illustrate more fully the manner of producing the dyes represented by Formula I above:

*Example 1.*—Bis(1 - carboxymethyl - 2:5 - dimethyl - 3-pyrrole)-methincyanine bisulphate

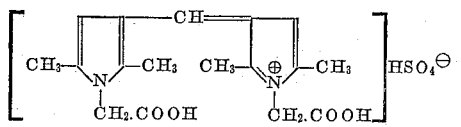

1 - carboxymethyl - 2:5 - dimethylpyrrole [Fischer, Ber. 1901, 34, 438] (15.3 grams, 0.1 mol) and ethyl orthoformate (20 cc., 0.12 mol) were dissolved in ethanol (25 cc.) at room temperature and the solution was filtered. To this solution was added a chilled solution of concentrated sulphuric acid (11.25 cc., 0.21 mol) in ethanol (50 cc.). There was a rise in temperature and the dye solution was allowed to stand with occasional hand stirring for one hour during which time solid material separated. The mixture was then chilled, the dye was collected and washed with ethanol. After drying the product weighed 15.5 grams (75%), M. P. 211° C.– 212° C. (decomp.) with darkening at 170°–180° C., M. P. (dip) 215° (decomp.). The dye has an absorption maximum in water at 445 m$\mu$. $C_{17}H_{21}O_4N_2.HSO_4$ requires 49.3% C, 5.3% H, 6.75% N, 7.73% S, while sample on analysis gave 49.6% C, 5.85% H, 6.3% N, 7.85% S.

*Example 2.*—Bis(1 - carboxymethyl - 2:5 - dimethyl - 3-pyrrole)methincyanine bisulphate.

1-carboxymethyl-2:5-dimethylpyrrole (5.1 grams, 0.033 mol) was refluxed in formic acid (specific gravity 1.2) (5 cc., 0.13 mol) for 5 minutes. The dye solution was chilled and a solution of concentrated sulphuric acid (4 cc., 0.075 mol) in ethanol (20 cc.) was added. The product separated from solution on further chilling. It was filtered off and washed with ethanol. The yield of dye was 1.6 gram (23%), M. P. (dip) 215° C. with decomposition.

The novel dyes of my invention can advantageously by used in the preparation of photographic light-screening layers by simply dissolving the dye in water, or a mixture of water and ethyl alcohol (or ethyl alcohol containing a small amount of sulphuric acid) and adding the resulting solution to an aqueous colloidal solution before coating. Useful hydrophilic colloids which can be used for this purpose are gelatin, polyvinyl alcohol, albumen, casein, etc. For example, 1.5 g. of the dye obtained in Example 1 was dissolved in a mixture of 37.5 cc. of water, 34.5 cc. of ethyl alcohol and 3 cc. of 2-N-sulphuric acid, this solution added to 4.5 l. of 5% aqueous gelatin, and this mixture coated on the reverse side of a support which had been coated with a photographic silver halide emulsion layer. After exposure of the photographic element in the usual manner, development of the exposed material in a developer having the following composition:

| | Grams |
|---|---|
| Hydroquinone | 49 |
| Sodium hydroxide | 37.5 |
| Sodium sulphite (desiccated) | 90.0 |
| Potassium bromide | 30 |

Water to make one liter.

for two minutes resulted in complete removal of the dye from the photographic element.

My invention can be further illustrated by reference to the accompanying drawing. As shown therein, the figure is a sectional view of a photographic element comprising a support 10 of any suitable material, such as cellulose acetate, polyethylene terephthalate, etc., coated with a photographic silver halide emulsion layer, and on the opposite side of the support, an antihalation layer 12 containing bis(1-carboxymethyl-2:5-dimethyl-3-pyrrole)-methincyanine bisulphate. While the drawing only shows the use of the dyes of my invention in an anti-halation layer of a photographic element containing only one silver halide emulsion, it is to be understood that my invention contemplates the use of photographic elements containing a plurality of photographic emulsions, such as those conventionally used in color photography wherein each of the emulsions is sensitized to a different region of the spectrum. My invention also contemplates photographic elements wherein the light-screening layer is located on the same side of the support as the photographic silver halide emulsion layer or layers. Such variations are obviously within the skill of the art and my invention is not to be limited to the particular structure shown in the single figure of the drawing.

The "dip" melting points recorded in Examples 1 and 2 were conducted by heating the melting point apparatus to 200° C. before immersing the tube containing the sample and then the melting point was determined in the usual way.

What I claim as my invention and desire secured by Letters Patent of the United States is:

1. A photographic element comprising a support having thereon at least one light-sensitive silver halide emulsion layer and a light-screening layer comprising a hydrophilic colloid containing a dye selected from those represented by the following general formula:

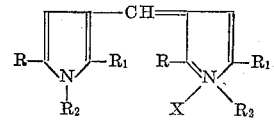

wherein R and $R_1$ each represents a lower alkyl group, $R_2$ represents a carboxyalkyl group, and X represents an acid radical.

2. A photographic element comprising a support having thereon at least one light-sensitive silver halide emulsion layer and a light-screening layer comprising gelatin containing a dye selected from those represented by the following general formula:

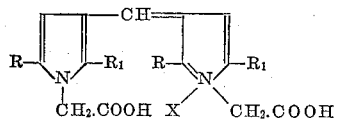

wherein R and $R_1$ each represents a lower alkyl group and X represents an acid radical.

3. A photographic element comprising a transparent support having on one side thereof a light-sensitive silver halide emulsion layer and coated on the opposite side of said support and contiguous thereto a light-screening layer comprising a hydrophilic colloid containing a dye selected from those represented by the following general formula:

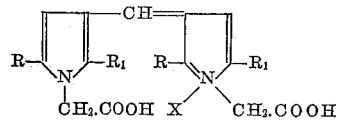

wherein R and $R_1$ each represents a lower alkyl group and X represents an acid radical.

4. A photographic element comprising a transparent support having on one side thereof a light-sensitive silver halide emulsion layer and coated on the opposite side of said support and contiguous thereto a light-screening layer comprising gelatin containing a dye selected from those represented by the following general formula:

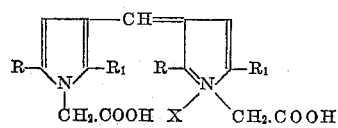

wherein R and R₁ each represents a lower alkyl group and X represents an acid radical.

5. A photographic element comprising a support having thereon a light-sensitive silver halide emulsion layer and a light-screening layer comprising a hydrophilic colloid containing a dye selected from those represented by the following general formula:

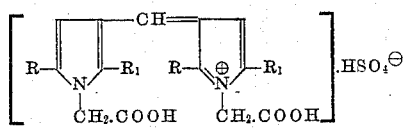

wherein R and R₁ each represents a lower alkyl group.

6. A photographic element comprising a support having thereon a light-sensitive silver halide emulsion layer and a light-screening layer comprising gelatin containing a dye selected from those represented by the following general formula:

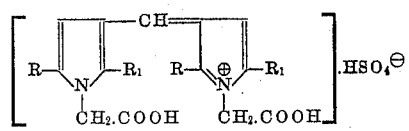

wherein R and R₁ each represents a lower alkyl group.

7. A photographic element comprising a support having thereon a light-sensitive silver halide emulsion layer and a light-screening layer comprising a hydrophilic colloid containing a dye represented by the following formula:

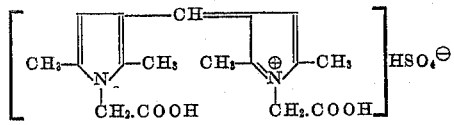

8. A photographic element comprising a support having thereon a light-sensitive silver halide emulsion layer and a light-screening layer comprising gelatin containing a dye represented by the following formula:

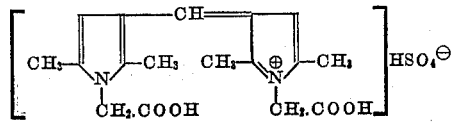

9. A photographic element comprising a transparent support having thereon a light-sensitive silver halide emulsion layer and on the opposite side of said support and contiguous thereto a light-screening layer comprising a hydrophilic colloid containing a dye represented by the following formula:

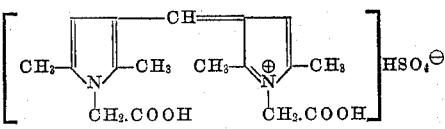

10. A photographic element comprising a transparent support having thereon a light-sensitive silver halide emulsion layer and on the opposite side of said support and contiguous thereto a light-screening layer comprising gelatin containing a dye represented by the following formula:

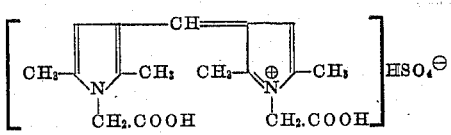

11. A photographic element comprising a support having thereon at least one light-sensitive silver halide emulsion layer and a light-screening layer comprising gelatin containing a dye selected from those represented by the following general formula:

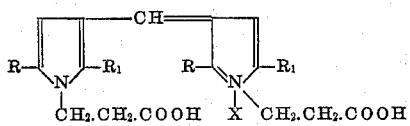

wherein R and R₁ each represents a lower alkyl group and X represents an acid radical.

References Cited in the file of this patent
UNITED STATES PATENTS

| | | |
|---|---|---|
| 2,390,707 | Heimbach | Dec. 11, 1945 |
| 2,496,843 | Anish | Feb. 7, 1950 |
| 2,537,876 | Brooker et al. | Jan. 9, 1951 |
| 2,725,378 | Reed | Nov. 29, 1955 |